US012624834B2

(12) United States Patent (10) Patent No.: US 12,624,834 B2

Gey et al. (45) Date of Patent: May 12, 2026

---

(54) REAL-TIME FLARE OPTIMIZATION USING AN EDGE DEVICE

(71) Applicant: Schlumberger Technology Corporation, Sugar Land, TX (US)

(72) Inventors: Gian-Marcio Gey, London (GB); Andrew Emil Pomerantz, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 373 days.

(21) Appl. No.: 18/554,559

(22) PCT Filed: Apr. 7, 2022

(86) PCT No.: PCT/US2022/071602

§ 371 (c)(1),
(2) Date: Oct. 9, 2023

(87) PCT Pub. No.: WO2022/217259

PCT Pub. Date: Oct. 13, 2022

(65) Prior Publication Data

US 2024/0219023 A1 Jul. 4, 2024

Related U.S. Application Data

(60) Provisional application No. 63/171,660, filed on Apr. 7, 2021.

(51) Int. Cl.
*F23G 7/08* (2006.01)
*F23N 1/08* (2006.01)
(Continued)

(52) U.S. Cl.
CPC ............ *F23G 7/085* (2013.01); *F23N 1/082* (2013.01); *G06T 7/11* (2017.01); *G06T 11/60* (2013.01);
(Continued)

(58) Field of Classification Search
CPC .......... F23N 1/082; F23N 5/242; F23N 5/082; F23N 3/002; F23N 2231/20;
(Continued)

(56) References Cited

U.S. PATENT DOCUMENTS

2008/0233523 A1* 9/2008 Diepenbroek ............ F23G 5/50
431/14
2009/0046172 A1 2/2009 Rao
(Continued)

FOREIGN PATENT DOCUMENTS

CN 106442246 A 2/2017
CN 112503550 A 3/2021
(Continued)

OTHER PUBLICATIONS

Search Report and Written Opinion of International Patent Application No. PCT/US2022/071602 dated Jul. 18, 2022, 12 Pages.
(Continued)

*Primary Examiner* — Alfred Basichas
(74) *Attorney, Agent, or Firm* — Kyle R. Miiller

(57) ABSTRACT

Automated systems and methods are provided for continuous monitoring of the flaring of waste gas at an industrial facility, which employ an RGB camera operably coupled to a gateway device by a data communication interface. The RGB camera is configured to capture time-series color image frames of a flare and communicate the time-series color image frames to the gateway device. The gateway device includes an image processing module and a flare optimization module executing on the gateway device. The image processing module is configured to process the time-series color image frames to determine at least one flare parameter that provides a qualitative measurement of the combustion efficiency of the flare over time. The flare optimization module is configured to adjust relative amount (Continued)

of waste gas to at least one assist gas for the flare based on the at least one flare parameter to continuously optimize the combustion efficiency of the flare.

31 Claims, 7 Drawing Sheets

(51) Int. Cl.
  *G06T 7/11*      (2017.01)
  *G06T 11/60*     (2006.01)

(52) U.S. Cl.
  CPC   *F23N 2229/20* (2020.01); *G06T 2207/10024* (2013.01); *G06T 2207/20081* (2013.01); *G06T 2207/20084* (2013.01)

(58) Field of Classification Search
  CPC ............. F23N 2229/04; F23N 2231/12; F23N 2229/20; F23N 2231/06; F23G 7/08; F23G 5/50; F23G 7/085; F23L 7/005; F23L 2900/00; G06T 11/60; G06T 7/11; G06T 2207/10024; G06T 2207/20081; G06T 2207/20084; G05B 2219/37572
  See application file for complete search history.

(56)     References Cited

U.S. PATENT DOCUMENTS

| | | | |
|---|---|---|---|
| 2011/0085030 A1 | 4/2011 | Poe et al. | |
| 2011/0195364 A1* | 8/2011 | Tullos | F23G 5/50 |
| | | | 431/75 |
| 2018/0209853 A1 | 7/2018 | Kraus | |
| 2018/0329904 A1* | 11/2018 | Gupta | G06F 16/164 |
| 2018/0330027 A1* | 11/2018 | Sen | B08B 13/00 |
| 2020/0386404 A1 | 12/2020 | Kraus et al. | |
| 2023/0272910 A1* | 8/2023 | Goyal | G06T 7/20 |
| | | | 382/107 |

FOREIGN PATENT DOCUMENTS

| | | |
|---|---|---|
| JP | H0690080 B2 | 11/1994 |
| JP | H0849845 A | 2/1996 |
| JP | 2001256475 A | 9/2001 |
| WO | 0155644 A1 | 8/2001 |

OTHER PUBLICATIONS

Flaring Maps and Data, https://skytruth.org/flaring/, CC BY-SA 2.0, via Wikimedia Commons, pp. 1-8.
Extended Search Report on EPT Patent Application 22785650 dated Jan. 29, 2025, 8 pages.
International Preliminary Report on Patentability of International Patent Application No. PCT/US2022/071602 Dated Oct. 19, 2023, 8 Pages.

* cited by examiner

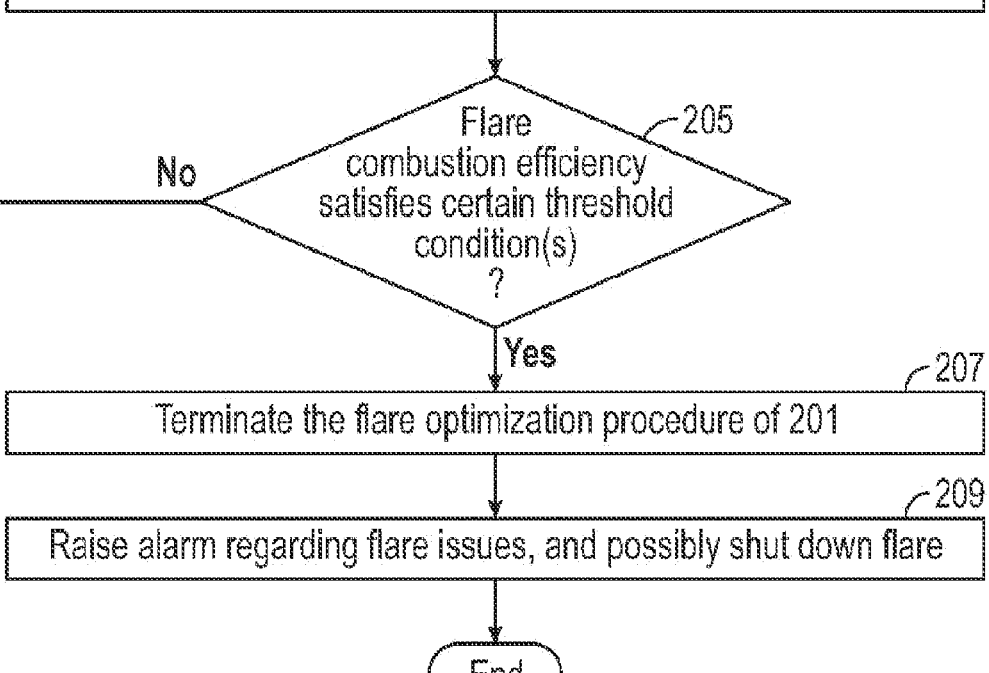

Perform a continuous flare optimization procedure that controls the valve(s) (or flow control device(s)) to make small changes to the relative amount (ratio) of waste gas to one or more assist gases (e.g. air, steam, other assist gas, or a combination thereof) to optimize combustion efficiency of the flare based on qualitative measures of the combustion efficiency determined from the analysis of the time-series color image frames of the flare; for example, the qualitative measures can be flare parameters representing amount of efficient combustion or fire, amount of inefficient combustion or smoke, and color temperature of the flare where more efficient combustion (fire), less inefficient combustion (smoke), and hotter color temperature infers higher combustion efficiency

201

Concurrent with the continuous flare optimization procedure of 201, evaluate the qualitative measures of flare combustion efficiency (e.g, flare parameters) to determine if the combustion efficiency of the flare satisfies certain threshold condition(s) for termination

203

Flare combustion efficiency satisfies certain threshold condition(s)?

205

No

Yes

Terminate the flare optimization procedure of 201

207

Raise alarm regarding flare issues, and possibly shut down flare

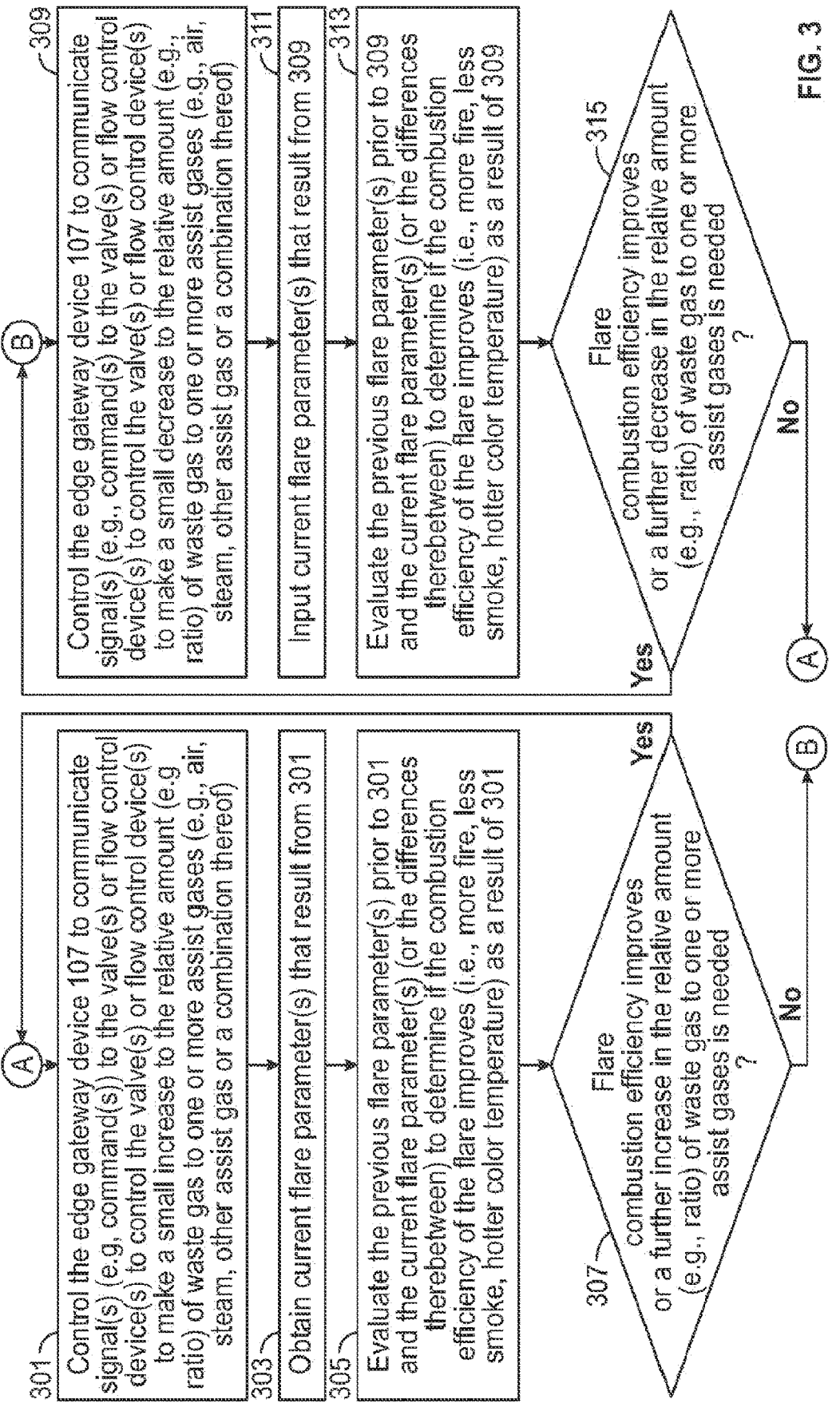

301 Control the edge gateway device 107 to communicate signal(s) (e.g, command(s)) to the valve(s) or flow control device(s) to control the valve(s) or flow control device(s) to make a small increase to the relative amount (e.g ratio) of waste gas to one or more assist gases (e.g., air, steam, other assist gas or a combination thereof)

303 Obtain current flare parameter(s) that result from 301

305 Evaluate the previous flare parameter(s) prior to 301 and the current flare parameter(s) (or the differences therebetween) to determine if the combustion efficiency of the flare improves (i.e., more fire, less smoke, hotter color temperature) as a result of 301

307 Flare combustion efficiency improves or a further increase in the relative amount (e.g., ratio) of waste gas to one or more assist gases is needed ?

309 Control the edge gateway device 107 to communicate signal(s) (e.g., command(s)) to the valve(s) or flow control device(s) to control the valve(s) or flow control device(s) to make a small decrease to the relative amount (e.g., ratio) of waste gas to one or more assist gases (e.g., air, steam, other assist gas or a combination thereof)

311 Input current flare parameter(s) that result from 309

313 Evaluate the previous flare parameter(s) prior to 309 and the current flare parameter(s) (or the differences therebetween) to determine if the combustion efficiency of the flare improves (i.e., more fire, less smoke, hotter color temperature) as a result of 309

315 Flare combustion efficiency improves or a further decrease in the relative amount (e.g., ratio) of waste gas to one or more assist gases is needed ?

FIG. 3

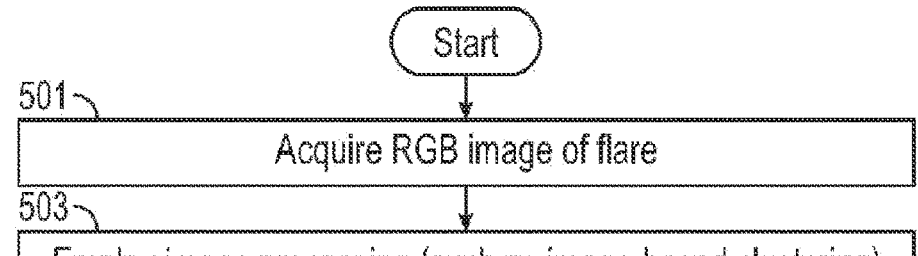

Start

501 —

Acquire RGB image of flare

503 —

Employ image processing (such as image-based clustering) to segment the pixels of the RGB image corresponding to the efficient combustion (fire) of the flare (e.g., red or orange pixels of the RGB image); the total count of these pixels represents the amount of efficient combustion (fire) of the flare

505 —

Employ image processing (such as image-based clustering) to segment the pixels of the RGB image corresponding to the inefficient combustion (smoke) of the flare (e.g., black pixels of the RGB image); the total count of these pixels represents the amount of non-combustion (smoke) of the flare

507 —

Use the result of 503 and 505 to generate a pixel-wise label mask for the RGB image that includes label data for the pixels of the RGB image, where the label data for a given pixel identifies the given pixel as "efficient combustion/fire" or "inefficient combustion/smoke" or "background"

509 —

Use the RGB image of 501 and the pixel-wise label mask of 507 as training data to train a machine learning model (which predicts a label mask that includes label data, "efficient combustion/fire" or "inefficient combustion/smoke" or "background", for each pixel of an RGB image supplied as input to the machine learning model)

511 —

Repeat 501 to 509 for additional RGB images of a flare

513 —

Deploy the trained machined learning model for use as part of AI RGB image processing module 107A

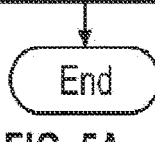

End

FIG. 5A

REAL-TIME FLARE OPTIMIZATION USING AN EDGE DEVICE

CROSS-REFERENCE TO RELATED APPLICATION(S)

The present application is a National Stage Entry of International Application No. PCT/US2022/071602, filed on Apr. 7, 2022, which claims priority from U.S. Prov. Pat. Appl. No. 63/171,660, filed on Apr. 7, 2021, herein incorporated by reference in its entirety.

FIELD

The present disclosure relates to systems and methods that monitor and control flare stacks over time.

BACKGROUND

Flare stacks are commonly used in many industries to safely burn off harmful combustible waste gases and byproducts, which is referred to as waste gas herein. For example, flare stacks are used extensively to dispose of waste gases from refineries, gases produced with oil from oil wells, vented gases from blast furnaces, unused gases from coke ovens, and gaseous wastes from chemical industries. Typically, the waste gases flared from refineries, petroleum production, and chemical industries are composed largely of low molecular weight hydrocarbons with high heating value. All of these industries have the challenge of minimizing harmful emissions, complying with regulations, and managing the high cost of manual monitoring and maintenance.

The combustion efficiency of flare stack relates to the relative amount of hydrocarbons of the waste gas that are consumed by the combustion process as compared to the amount of hydrocarbons of the waste gas that are not consumed by the combustion process. If the flare stack is operating with low combustion efficiency, carbon particles (soot), unburned hydrocarbons, and carbon monoxide are emitted from the flare stack. If the flare stack is operating with high combustion efficiency, the emission of carbon particles (soot), unburned hydrocarbons, and carbon monoxide is significantly reduced. In order to minimize greenhouse gas emissions and potential safety hazards, it is beneficial to operate the flare stack with high combustion efficiency.

Existing technologies are used to monitor the flare produced by a flare stack. For example, infrared cameras and/or spectrometers are used to characterize the combustion efficiency of the flare stack by measuring hydrocarbon (typically methane) concentration and carbon dioxide concentration of the flare. This technology provides a quantitative estimate of combustion efficiency, although the infrared equipment is relatively expensive. The combustion efficiency of the flare stack can also be measured in controlled conditions by sampling the air around the flare and measuring the hydrocarbon and carbon dioxide concentrations. However, that method is difficult to apply in the field and can be expensive.

SUMMARY

Automated systems and methods are provided for continuous monitoring of the flaring of waste gas at an industrial facility wherein an RGB camera is operably coupled to a gateway device by a data communication interface. The RGB camera is configured to capture time-series color image frames of a flare produced at the industrial facility and communicate the time-series color image frames to the gateway device. The gateway device includes an image processing module and a flare optimization module executing on the gateway device. The image processing module is configured to process the time-series color image frames to determine at least one flare parameter that provides a qualitative measurement of the combustion efficiency of the flare over time. The flare optimization module is configured to adjust relative amount of waste gas to at least one assist gas (e.g., air, steam, other assist gas, or a combination thereof) for the flare based on the at least one flare parameter to continuously optimize the combustion efficiency of the flare.

In embodiments, the flare optimization module can be configured to control the relative amount of waste gas to the at least one assist gas that produces the flare to optimize the at least one flare parameter.

In embodiments, the systems and methods further employ a flare stack with a flare tip, an electric valve or flow control device operably coupled to the gateway device by a data communication interface, the electric valve or flow control device fluidly coupled to a supply of waste gas, and at least one additional electric valve or flow control device operably coupled to the gateway device by a data communication interface, the at least one additional electric valve or flow control device fluidly coupled to a supply of one or more assist gases (e.g., air, steam, other assist gas, or a combination thereof). The gateway device can be configured to communicate signals or commands to at least one of the electric valve or flow control device and the at least one additional valve or flow control device based on the execution of the flare optimization module in order to adjust the relative amount of waste gas to the one or more assist gases supplied to the flare tip for mixing and combustion that produces the flare to continuously optimize the combustion efficiency of the flare.

In embodiments, the at least one flare parameter can represent the amount of efficient combustion of the flare and the amount of inefficient combustion of the flare. In this case, the flare optimization module can be configured to optimize the at least one flare parameter by yielding more efficient combustion and less inefficient combustion of the flare.

In embodiments, the at least one flare parameter can represent the ratio of smoke to fire of the flare or the ratio of fire to smoke of the flare. In this case, the flare optimization module can be configured to optimize the at least one flare parameter by minimizing the ratio of smoke to fire of the flare or by maximizing the ratio of fire to smoke of the flare.

In embodiments, the at least one flare parameter can further represent color temperature of the combustion of the flare. In this case, the flare optimization module can be configured to further optimize the at least one flare parameter by adjusting the color temperature of the combustion of the flare for hotter color temperature (i.e., more toward the blue, less toward the red).

In embodiments, the image processing module can include at least one machine learning model that determines the at least one flare parameter given an RGB image of the flare as input.

In embodiments, the at least one machine learning model can include a machine learning model that is trained to generate a pixel-wise label mask for an arbitrary RGB image of a flare supplied as input to the first machine learning model, wherein the pixel-wise label mask classifies the pixels of the arbitrary RGB image as corresponding to a set of predefined labels, wherein the set of predefined labels include a first label representing efficient combustion (or fire) of the flare and a second label representing inefficient combustion (or smoke) of the flare.

In embodiments, the image processing module can be further configured to process the pixel-wise label mask to determine a first pixel count and a second pixel count, wherein the first pixel count represents amount of efficient combustion (or fire) of the flare, and wherein the second pixel count represents amount of inefficient combustion (or smoke) of the flare. The ratio of the first pixel count over the second pixel count can be determined to represent the ratio of efficient combustion (or fire) of the flare to inefficient combustion (or smoke) of the flare. Similarly, the ratio of the second pixel count over the first pixel count can be determined to represent the ratio of inefficient combustion (or smoke) of the flare to efficient combustion (or fire) of the flare.

In embodiments, the first machine learning model can be trained with training data that includes at least one RGB image of a flare and a corresponding pixel-wise label mask for the RGB image, wherein the pixel-wise label mask is generated by image processing operations that segment pixels of the RGB image that correspond to the efficient combustion (or fire) of the flare as well as image processing operations that segment pixels of the RGB image that correspond to the inefficient combustion (or smoke) of the flare.

In embodiments, the first machine learning model can be a convolution encoder-decoder machine learning model.

In embodiments, the image processing module can be configured to process an arbitrary RGB image of a flare to determine data that represents color temperature of combustion of the flare.

In embodiments, the systems and methods can further employ a pressure sensor operably coupled to the gateway device by a data communication interface, the pressure sensor configured to measure flow line pressure of waste gas supplied to the flare tip and communicate data representing the flow line pressure to the gateway device, and an ignitor operably coupled to the gateway device by a data communication interface, the ignitor configured to supply an ignition flame to the flare tip when activated. The gateway device can be further configured to process the at least one flare parameter determined by the image processing module and the data representing the flow line pressure communicated from the pressure sensor, and selectively activate the ignitor based on such processing.

In embodiments, the industrial facility can be an oil production site (such as an oil well or pad or a complex of oil wells or pads), a refinery, or a chemical processing plant.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIGS. 2 and 3 are flow charts illustrating operations that can be carried out by the flare optimization module that executes on the edge gateway device of FIG. 1 for continuous flare optimization;

FIG. 5A is a flow chart illustrating operations that can be carried out to configure the AI RGB image analysis module that executes on the edge gateway device for continuous flare optimization;

DETAILED DESCRIPTION

Figure 1:
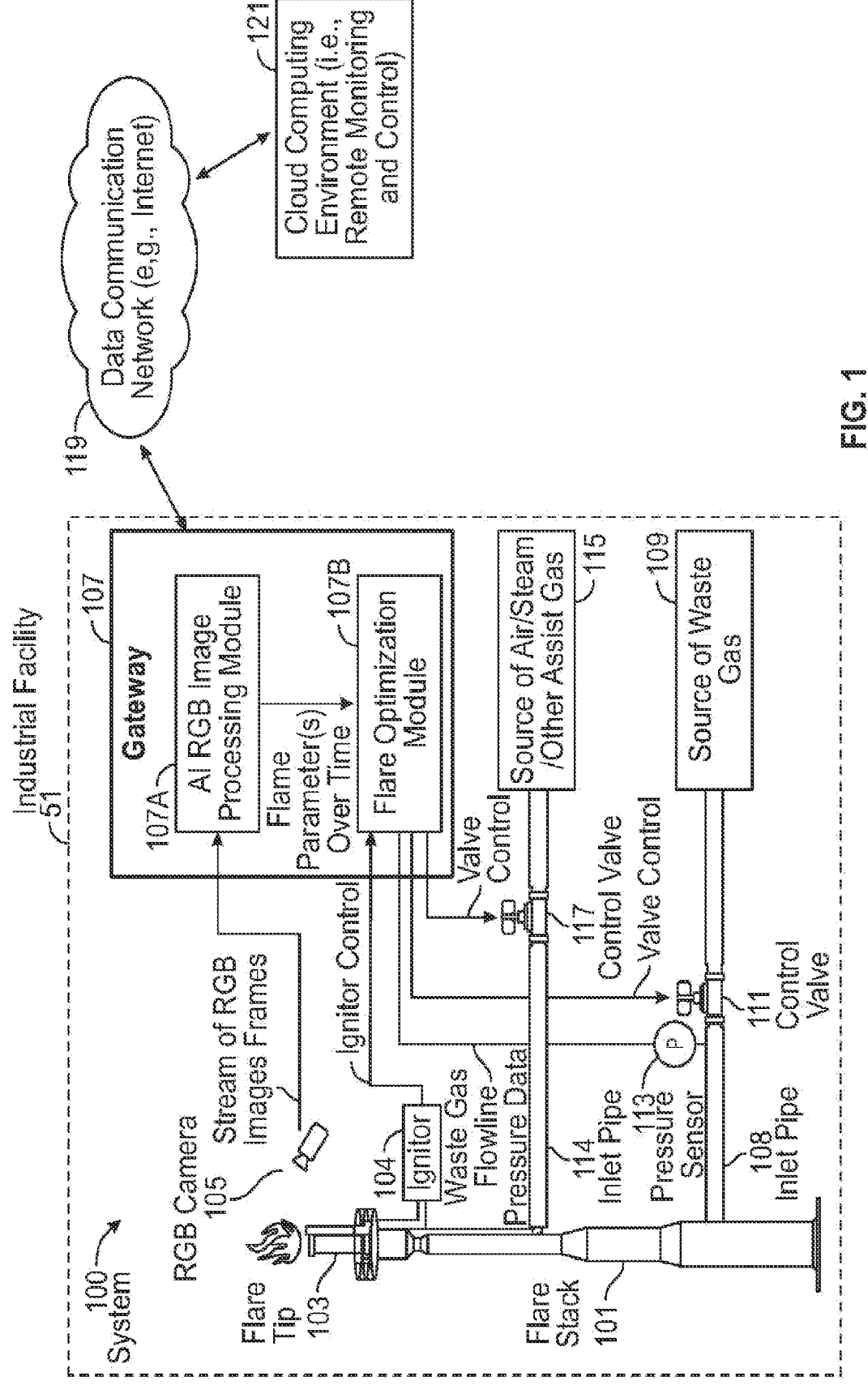
FIG. 1 is a schematic illustration of an example system in accordance with the present disclosure, which employs an RGB camera along with artificial intelligence (AI) image processing to control operational parameters of a flare stack to provide automated, continuous, real-time optimization of the combustion efficiency of the flare produced by the flare stack.

The particulars shown herein are by way of example and for purposes of illustrative discussion of the embodiments of the subject disclosure only and are presented in the course of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

This subject disclosure relates to methods and systems that autonomously monitor and optimize the combustion efficiency of a flare produced by a flare stack in real-time. In such methods and systems, an RGB camera is configured to capture time-series color image frames of the flare. Such time-series color image frames are communicated to a gateway device. An image processing module executing on the gateway device processes the time-series color image frames to determine one or more flare parameters that provide qualitative measurements of the combustion efficiency of the flare over time. In embodiments, the one or more flare parameters can represent the amount of efficient combustion (fire), the amount of non-efficient combustion (smoke), and possibly the color temperature of the combustion (fire) of the flare. In this case, more efficient combustion (fire), less inefficient combustion (smoke), and possibly hotter color temperature of the combustion is a qualitative measurement of higher combustion efficiency; while less efficient combustion (fire), more inefficient combustion (smoke), and possibly cooler color temperature of the combustion is a qualitative measurement of lower combustion efficiency. In other embodiments, the at least one flare parameter can represent the ratio of smoke to fire of the flare or the ratio of fire to smoke of the flare. In this case, the flare optimization module can be configured to optimize the at least one flare parameter by minimizing the ratio of smoke to fire of the flare or by maximizing the ratio of fire to smoke of the flare.

Simultaneously, a flare optimization module executing on the gateway device adjusts the relative amount of waste gas to at least one assist gas (e.g., air, steam, other assist gas, or a combination thereof) that is supplied to the flare stack to continuously optimize the combustion efficiency of the flare by controlling the relative amount of waste gas to the at least one assist gas to optimize the one or more flare parameters. The optimization of the combustion efficiency of the flare can also involve adjusting the color temperature of the combustion (fire) of the flare for hotter color temperature (i.e., more toward the blue, less toward the red).

The methods and systems do not measure the combustion efficiency of the flare quantitatively. Instead, the combustion efficiency of the flare is measured qualitatively. For example, the combustion efficiency of the flare can be measured qualitatively by the amount of efficient combustion (fire) and the amount of inefficient combustion (smoke) (or the relative amount of efficient combustion (fire) to non-efficient combustion (smoke) determined from the analysis of the time-series color image frames of the flare. In this case, flares with higher combustion efficiency have more efficient combustion (fire) and less inefficient combustion (smoke); while flares with lower combustion efficiency have less efficient combustion (fire) and more inefficient combustion (smoke). Furthermore, the combustion efficiency of the flare can be measured qualitatively by the color temperature of the combustion of the flare determined from the analysis of the time-series color image frames of the flare. In this case, flares with higher combustion efficiency have a hotter color temperature (more toward the blue, less toward the red) for the combustion; while flares with lower combustion efficiency have a cooler color temperature (more toward the red, less toward the blue) for the combustion. Note that these qualitative measurements produce qualitative data that is descriptive in nature for the combustion efficiency of the flare. They do not produce quantitative data that refers to numerical values that directly represent the combustion efficiency of the flare. Advantageously, these qualitative measurements can be performed using an inexpensive RGB camera in conjunction with the image processing modules executing on the gateway.

Furthermore, the methods and systems autonomously optimize the combustion efficiency of the flare produced by the flare stack in real-time by configuring the gateway to control the relative amount of waste gas to at least one assist gas (e.g., air, steam, other assist gas, or a combination thereof) to optimize the qualitative measurements of flare combustion efficiency determined from the analysis of the time-series color image frames of the flare over time.

FIG. 1 illustrates an example system 100 in accordance with the present disclosure. System 100 employs an RGB camera along with artificial intelligence (AI) image processing to control operational parameters of a flare stack to provide automated, continuous, real-time optimization of the combustion efficiency of the flare produced by the flare stack. The system 100 is located at or near an industrial facility 51 and configured to dispose of waste gas that is collected at the industrial facility 51. In embodiments, the industrial facility 51 can be a production site (e.g., oil well or pad or a complex of oil wells or pads), a refinery, or a chemical processing plant. The system 100 includes an edge gateway device 107 that is located at or near (e.g., at a distance of 10 km or less) the industrial facility 51. The edge gateway device 107 is a computing device that can be configured to deliver performance edge computing and secure data ingestion. The edge gateway device 107 can be configured to enable real-time monitoring and control of the operational equipment at the industrial facility 51.

The edge gateway device 107 can be configured to receive, collect, aggregate, and process data from a variety of operational equipment at the industrial facility 51 (such as sensors, controllers, actuators, programmable logic controllers, remote terminal units, and supervisory control and data acquisition (SCADA) systems) for autonomous control of the operational equipment at the industrial facility 51.

Furthermore, the edge gateway device 107 can be configured for data communication between the edge gateway device 107 and at least one remote cloud computing environment 121 over a data communication network 119 as shown in FIG. 1. The data communication network 119 can include a cellular data network, satellite link, other Wide Area Network, the Internet, and/or another mode of available data communication. The cloud computing environment 121 can be implemented by one or more processor-based systems as is well known. The data communication between the edge gateway device 107 and the cloud computing environment(s) 121 can be configured to enable remote configuration and management of the edge gateway device 107 and possibly remote monitoring and control of the operational equipment at the industrial facility 51.

In embodiments, the edge gateway device 107 can employ a compact and rugged NEMA/IP rated housing for outdoor use, making it suitable for the environments at well sites and facilities. The overall packaging can also be environmentally qualified.

In embodiments, the gateway device 107 can be configured with a bi-directional communication interface (typically referred to as a Southbound Interface) for data communication to the operational equipment at the facility 51 using either a wired communication protocol (such as a serial, Ethernet, Modbus or Open Platform Communication (OPC) protocol) or a wireless communication protocol (such as IEEE 802.11 Wi-Fi protocol, Highway Addressable Remote Transducer Protocol (HART), LoraWAN, WiFi or Message Queuing Telemetry Transport (MQTT)). The Southbound Interface can provide for direct data communication to the operational equipment at the facility 51. Alternatively, the Southbound Interface can provide for indirect data communication to the operational equipment at the facility 51 via a local area network or other local communication devices.

In embodiments, the edge gateway device 107 can be configured with a bi-directional communication interface (typically referred to as a Northbound Interface) to the data communication network 119 using a wireless communication protocol. In embodiments, the wireless communication protocol can employ cellular data communication, such as 4G LTE data transmission capability (or possibly 3G data transmission for fallback capability). For facilities without a cellular signal, the Northbound Interface to the data communication network 119 can be provided by a bidirectional satellite link (such as a BGAN modem). Alternatively, the Northbound Interface can implement other wireless communication protocols or wired communication protocols implemented by the data communication network 119.

In embodiments, the edge gateway device 107 can employ an embedded processing environment (e.g., data processor and memory system) that hosts and executes an operating system and application(s) or module(s) as described herein.

In embodiments, the edge gateway device 107 can employ both hardware-based and software-based security measures. The hardware-based security measures can involve a hardware root-of-trust established using an industry-standard Trusted Platform Module (TPM) v2.0 cryptographic chip. The software-based security measures can include operating system hardening and encryption of both buffered and transmitted data.

In embodiments, the edge gateway device 107 can support a containerized microservice-based architecture. This architecture enables extensibility into several distinct and different solutions for different environments and applications at the edge, while still using the same infrastructure components. In embodiments, the edge gateway device 107 can employ one or more containers to implement one or more applications or modules executing on the gateway device 107 that perform functionality for monitoring and optimizing a flare as described herein. A container is a standard unit of software that packages up code and all its dependencies (such as runtime environment, system tools, system libraries, and settings) so that the application or module runs quickly and reliably in the computing environment of the edge gateway device 107. The container isolates the software from its environment and ensures that it works uniformly and reliably in the computing environment of the edge gateway device 107.

The system 100 further includes a flare stack 101 having a flare tip 103 at its top end. The bottom end of the flare stack 101 can be mounted to the ground surface at or near the facility 51, or to some other support structure located above the ground surface at or near the facility 51. The flare tip 103 is supported at an elevated height above the ground. An inlet pipe 108 is configured to deliver a supply of waste gas from a source of waste gas 109 to the flare stack 101 which flows through internal piping or flow channels (or external piping) to the flare tip 103. In embodiments, source 109 can be a vessel (commonly referred to as a knockout drum) that is supplied with waste fluid collected at the facility 51, where the waste fluid includes waste gas and possibly unwanted liquid-phase components (such as condensates). The vessel is configured to separate the unwanted liquid-phase components from the waste gas and supplies the waste gas to the inlet pipe 108 via an electric control valve or other flow control device 111. The electric control valve (or flow control device) 111 is fluidly coupled to the inlet pipe 108 between the flare stack 101 and the source 109 and operated under the control of electrical signals (or commands) communicated thereto to control the flow of the waste gas that flows through the inlet pipe 108 to the flare stack 101 and to the flare tip 103. The electric control valve (or flow control device) 111 includes electronics that provide for data communication between the electric control valve (or flow control device) 111 and the edge gateway device 107 (e.g., between the electric control valve 111 and the Southbound Interface of the edge gateway device 107). In embodiments, the data communication can implement a predefined wireless or wired communication protocol that carries electrical signals (or command(s)) from the edge gateway device 107 to the valve (or device) 111 (labeled "valve control" in FIG. 1), where such signals (or command(s)) control the operation of the electric control valve (or device) 111 over time. A pressure sensor 113 is fluidly coupled to the inlet pipe 108 (or to the piping of the flare stack 101 or flare tip 103), preferably downstream of the valve 111, and is configured to measure the pressure of the waste gas that flows through the inlet pipe 108 to the flare stack 101 and to the flare tip 103. The pressure sensor 113 includes electronics that provide for data communication between the pressure sensor 113 and the edge gateway device 107 (e.g., between the pressure sensor 113 and the Southbound Interface of the edge gateway device 107). In embodiments, the data communication can implement a predefined wireless or wired communication protocol that communicates data from the pressure sensor 113 to the edge gateway device 107 (labeled "waste gas flowline pressure data" in FIG. 1), where such data represents values of the pressure of the waste gas that flows through the inlet pipe 108 to the flare stack 101 and to the flare tip 103 over time.

An inlet pipe 114 is configured to deliver a supply of air (or steam or other assist gas or combinations thereof) from a source of assist gas to the flare stack 101, which flows through internal or external piping of the flare stack 101 to the flare tip 103. An electric control valve (or other flow control device) 117 is fluidly coupled to the inlet pipe 114 between the flare stack 101 and the source 115 and operated under the control of electrical signals (or commands) communicated thereto to control the flow of the assist gas that flows through the inlet pipe 114 to the flare stack 101 and to the flare tip 103. The electric control valve (or flow control device) 117 includes electronics that provide for data communication between the electric control valve (or flow control device) 117 and the Southbound Interface of the edge gateway device 107. In embodiments, the data communication can implement a predefined wireless or wired communication protocol that carries electrical signals (or command(s)) from the edge gateway device 107 to the valve (or flow control device) 117 (labeled "valve control" in FIG. 1), where such signals (or command(s)) control the operation of the electric control valve (or flow control device) 117 over time. In alternate embodiments, the system can incorporate separate sources for different assist gases (such as air, steam, or other assist gas) with separate electric control valves (or other flow control devices) and corresponding inlet pipes that are configured to supply the different assist gases to the flare tip 103. Similar to electric control valve (or flow control device) 117 shown in FIG. 1, the electric control valves (or flow control devices) each include electronics that provide for data communication between the respective electric control valves (or flow control devices) and the Southbound Interface of the edge gateway device 107. In embodiments, the data communication can implement a predefined wireless or wired communication protocol that carries electrical signals (or command(s)) from the edge gateway device 107 to the respective valves (or flow control devices), where such signals (or command(s)) control the operation of the respective control valve (or flow control devices).

The flare tip 103 mixes the waste gas and the assist gas(es) (e.g., air, steam, other assist gas or a combination thereof) that flows to the flare tip 103 for combustion of the mixed stream as a flare (or flame) that is discharged from the open end of the flare tip 103. The flare tip 103 can also include other components, such as a wind deflector or wind shield, or other component(s), which are not shown in FIG. 1 for the sake of simplicity.

The system 100 also includes an electric ignitor 104 that is configured to provide a flame for igniting the combustible mixture of waste gas and air (or steam or other assist gas or a combination thereof) that flows to the flare tip 103 and forms the flare that is discharged from the open end of the flare tip 103. The electric ignitor 104 can be located close to the flare stack 101 and employ piping to carry the ignition flame to the flare tip 103. The electric ignitor 104 includes electronics that provide for data communication between the ignitor 104 and the edge gateway device 107 (e.g., between the ignitor 104 and the Southbound Interface of the edge gateway device 107). In embodiments, the data communication can implement a predefined wireless or wired communication protocol that carries electrical signals (or command(s)) from the edge gateway device 107 to the ignitor 104 (labeled "ignitor control" in FIG. 1), where such signals (or command(s)) control the operation of the electric ignitor 104 over time.

The system 100 also includes an RGB camera 105 that is positioned and oriented such that the flare that is discharged from the open end of the flare tip 103 is visible within the field of view of the camera 105. The RGB camera 105 is a camera equipped with a standard imaging sensor that collects visible light (preferably in the range from 400 nm to 700 nm) and converts it to a color image (RGB image frame) that replicates normal human vision. The RGB camera 105 is further equipped with electronics that provide for data communication between the RGB camera 105 and the edge gateway 107 (e.g., between the RGB camera 105 and the Southbound Interface of the edge gateway 107). In embodiments, the data communication can implement a predefined wireless or wired communication protocol that communicates the time-series RGB image frames (labeled "stream of RGB image frames" in FIG. 1) captured by the camera 105 from the camera 105 to the edge gateway device 107.

The edge gateway device 107 further includes an artificial intelligence (AI) image processing module 107A and a flare optimization module 107B. The AI image processing module 107A is configured to collect and process the time-series RGB image frames communicated from the camera 105 to the edge gateway device 107 to generate time-series operational data (flare parameters) that represents qualitative measurements of the combustion efficiency of the flare discharged from the open end of the flare tip 103 over time. In embodiments, the one or more flare parameters can represent the amount of efficient combustion (fire), the amount of inefficient combustion (smoke), and possibly the color temperature of the combustion of the flare. In this case, more efficient combustion (fire), less inefficient combustion (smoke), and possibly hotter color temperature of the combustion are qualitative measurements of higher combustion efficiency; while less efficient combustion (fire), more inefficient combustion (smoke), and possibly cooler color temperature of the combustion are qualitative measurements of lower combustion efficiency. The flare optimization module 107B processes the time-series operational data (flare parameter(s)) generated by the AI image processing module 107A to autonomously and automatically control the valves or flow control devices (such as valves 111, 117 of FIG. 1) to adjust the relative amount of waste gas and the one or more assist gases (e.g., air, steam, other assist gas, or a combination thereof) that is supplied to the flare tip 103 over time to optimize the combustion efficiency of the flare over time (e.g., such that the flare or flame that is discharged from the open end of the flare tip 103 has more efficient combustion (fire), less inefficient combustion (smoke), and possibly hotter color temperature of the combustion). For example, such adjustment can increase the relative amount (or ratio) of waste gas to the one or more assist gases that are supplied to the flare tip 103 in order to improve the combustion efficiency of the flare over time. In another example, such adjustment can decrease the relative amount (or ratio) of waste gas to the one or more assist gases that are supplied to the flare tip 103 in order to improve the combustion efficiency of the flare over time.

In embodiments, the edge gateway device 107 can be further configured to process the time-series operational data (flare parameters) generated by the AI image processing module 107A to automatically determine that the flare is not being discharged from the open end of the flare tip 103, and process waste gas flowline pressure data communicated from the pressure sensor 113 to automatically determine that waste gas is flowing to the flare tip 103. Based on these automatic determinations, the edge gateway device 107 can be further configured to autonomously and automatically control the ignitor 104 in order to selectively activate the ignitor 104. When activated, the ignitor 104 generates and supplies an ignition flame to the flare tip 103 to initiate combustion of the mixture of waste gas and air (or steam or other assist gas or a combination thereof) at the flare tip 103 such that the flare is discharged from the open end of the flare tip 103. In embodiments, such activation can involve communicating one or more suitable commands from the edge gateway device 107 to the ignitor 104 that activate the ignitor 104.

FIG. 2 is a flow chart illustrating operations that can be carried out by the flare optimization module 107B that executes on the edge gateway device 107.

The operations begin in block 201 by performing a continuous flare optimization procedure that communicates commands to valve(s) or flow control device(s) (for example, valves or flow control devices 111/117 in FIG. 1) to control the valve(s) or flow control device(s) to make small changes to the relative amount (ratio) of waste gas to one or more assist gases (e.g., air, steam, other assist gas or a combination thereof) to optimize combustion efficiency of the flare based on qualitative measures of the combustion efficiency determined from the analysis of the time-series color image frames of the flare (image analysis module 107A). In embodiments, the qualitative measures of the combustion efficiency can be flare parameters representing amount of efficient combustion (fire), amount of inefficient combustion (smoke), and possibly color temperature of the combustion. In this case, more efficient combustion (fire), less inefficient combustion (smoke) and possibly hotter color temperature of the combustion is a qualitative measure of higher combustion efficiency; while less efficient combustion (fire), more inefficient combustion (smoke), and possibly cooler color temperature of the combustion is a qualitative measure of lower combustion efficiency. In other embodiments, the qualitative measures of the combustion efficiency can be flare parameters representing the ratio of smoke to fire of the flare or the ratio of fire to smoke of the flare. In this case, a lower ratio of smoke to fire (or a higher ratio of fire to smoke) is a qualitative measure of higher combustion efficiency; while a higher ratio of smoke to fire (or a lower ratio of fire to smoke) is a qualitative measure of lower combustion efficiency. In this case, the flare optimization module can be configured to optimize the at least one flare parameter by minimizing the ratio of smoke to fire of the flare or by maximizing the ratio of fire to smoke of the flare.

In blocks 203 and 205, concurrent with the continuous flare optimization procedure of 201, the qualitative measures of flare combustion efficiency (e.g., flare parameters) as determined from the analysis of the time-series color image frames of the flare (image analysis module 107A) can be evaluated to determine if the combustion efficiency of the flare satisfies certain threshold condition(s) for termination. If not, the operations revert to continue the operations of blocks 201 and 203. If so, the operations continue to blocks 207 and 209.

In block 207, the flare optimization procedure of block 201 is terminated.

In block 209, an alarm is raised regarding operational issues of the flare. The alarm can be communicated to the cloud computing environment 121 for alerting the operator of the facility (or other user). Alternatively or additionally, the alarm can be communicated directly from the edge gateway device 107 to the operator of the facility (or other user) for alerting the operator of the facility (or other user). Furthermore, in block 209, the gateway device 107 can possibly take action to shut down the flare, which can involve controlling valve 111 to turn off the supply of waste gas to the flare tip 103.

FIG. 3 is a flow chart illustrating operations that can be carried out by the flare optimization module 107B that executes on the edge gateway device 107 for continuous flare optimization.

The operations of FIG. 3 include block 301, which involves controlling the edge gateway device 107 to communicate signal(s) (e.g., command(s)) to the valve(s) or flow control device(s) (for example, valve(s) or flow control device(s) 111/117 of FIG. 1) to control the valve(s) or flow control device(s) to make a small increase to the relative amount (e.g., ratio) of waste gas to one or more assist gases (e.g., air, steam, other assist gas or a combination thereof) supplied to the flare tip 103.

In block 303, the current flare parameter(s) that result from the increase to the relative amount (e.g., ratio) of waste gas to the one or more assist gases (e.g., air, steam or other assist gas or a combination thereof) as controlled in 301 are measured by the image processing module 107A and obtained by the flare optimization module 107B.

In block 305, the previous flare parameter(s) as measured by the image processing module 107A prior to 301 and the current flare parameter(s) of 303 (or the differences therebetween) are evaluated to determine if the combustion efficiency of the flare improves (i.e., more efficient combustion (fire), less inefficient combustion (smoke), and possibly hotter color temperature of combustion) as a result of 301.

In block 307, upon determining that the flare combustion efficiency improves or a further increase in the relative amount (e.g., ratio) of waste gas to one or more assist gases (air, steam, other assist gas or combination thereof) is needed, the operations revert back to 301 to repeat the operations of 301 to 307. Otherwise, the operations continue to block 309.

The operations of FIG. 3 also include block 309, which involves controlling the edge gateway device 107 to communicate signal(s) (e.g., command(s)) to the valve(s) or flow control device(s), (for example, valve(s) or flow control device(s) 111/117 of FIG. 1) to control the valve(s) or flow control device(s) to make a small decrease to the relative amount (e.g., ratio) of waste gas to the one or more assist gases (e.g., air, steam, other assist gas or a combination thereof) supplied to the flare tip 103.

In block 311, the current flare parameter(s) that result from the decrease to the relative amount (e.g., ratio) of waste gas to the one or more assist gases (e.g., air, steam, other assist gas or a combination thereof) as controlled in 309 are measured by the image processing module 107A and obtained by the flare optimization module 107B.

In block 313, the previous flare parameter(s) as measured by the image processing module 107A prior to 309 and the current flare parameter(s) of 311 (or the differences therebetween) are evaluated to determine if the combustion efficiency of the flare improves (i.e., more efficient combustion (fire), less inefficient combustion (smoke), and possibly hotter color temperature of combustion) as a result of 309.

In block 315, upon determining that the flare combustion efficiency improves or a further decrease in the relative amount (e.g., ratio) of waste gas to one or more assist gases (air, steam, or other assist gas, or a combination thereof) is needed, the operations revert back to 309 to repeat the operations of 309 to 315. Otherwise, the operations continue to block 301.

Figure 4:
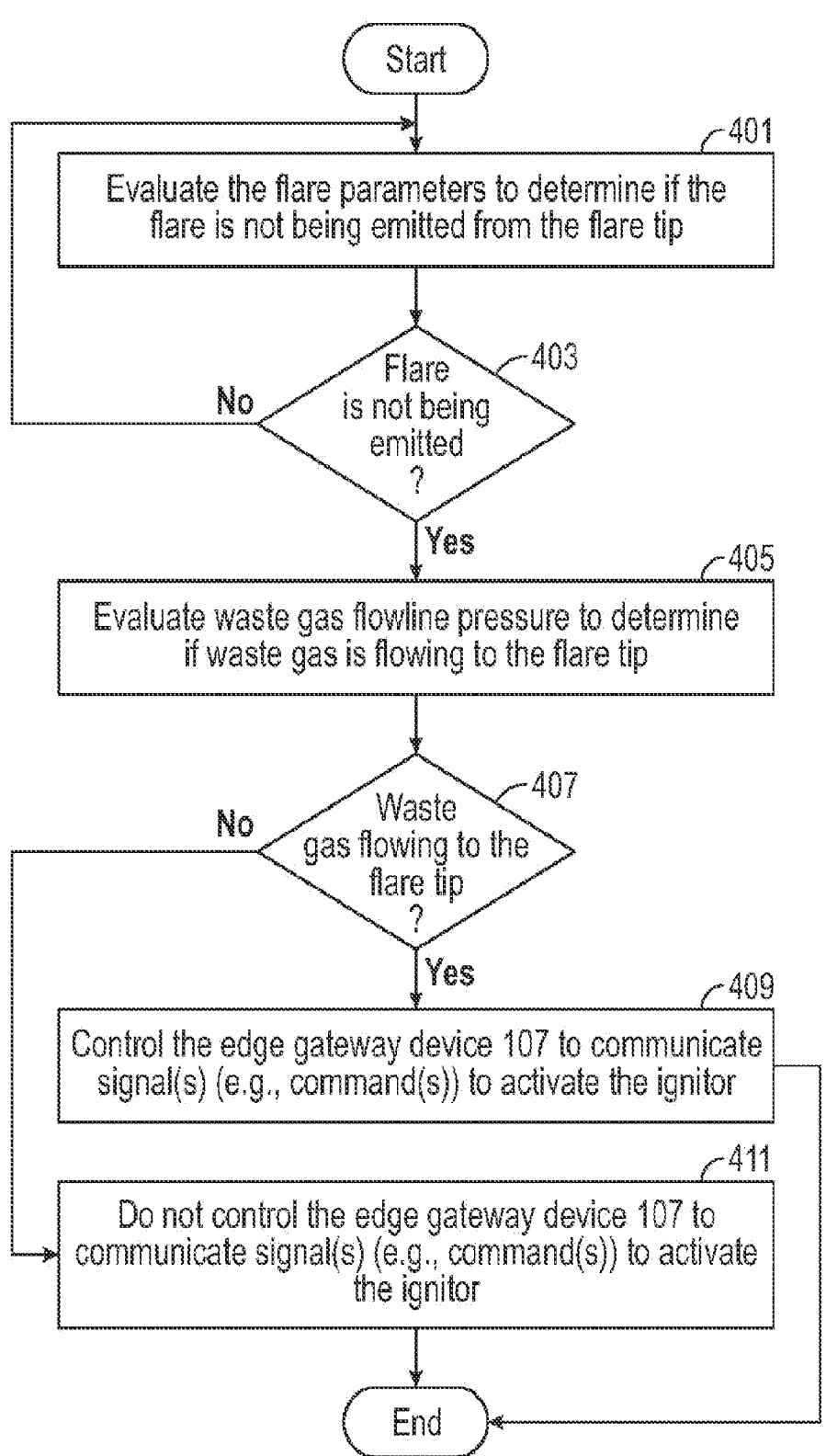
FIG. 4 is a flow chart illustrating operations that can be carried out by a module executing on the edge gateway device for automatic flare ignition.

FIG. 4 is a flow chart illustrating operations that can be carried out by a module that executes on the edge gateway device 107 for automatic flare ignition.

The operations begin at block 401 whereby the one or more flare parameters are determined by the image processing module 107A and obtained by the module and evaluated to determine if the flare is not being emitted from the flare tip 103. For example, the flare parameter representing the amount of efficient combustion (fire) as determined by the flare optimization module 107B can be obtained and evaluated to determine if it is less than a predetermined criterion which indicates that the flare is not being emitted from the flare tip 103.

In block 403, upon determining that the flare is not being emitted, the operations continue to block 405. Otherwise, the operations return to repeat the operations of 401 and 403.

In block 405, the waste gas flowline pressure is measured by the pressure sensor 113 and obtained by the module and evaluated to determine if waste gas is flowing to the flare tip 103. For example, the waste gas flowline pressure as measured by the pressure sensor 113 can be obtained and evaluated to determine if it is greater than a predetermined criterion which indicates that waste gas is flowing to the flare tip 103.

In block 407, upon determining that waste gas is flowing to the flare tip 103, the operations continue to block 409. Otherwise, the operations bypass 409 and continue to block 411.

In block 409, the module controls the edge gateway device 107 to communicate signal(s) (e.g., command(s)) to the ignitor 104 to activate the ignitor 104. When activated, the ignitor 104 generates and supplies an ignition flame to the flare tip 103 to initiate combustion of the mixture of waste gas and air (or steam or other assist gas) at the flare tip 103 such that the flare is discharged from the open end of the flare tip 103.

In block 411, the module is configured such that the edge gateway device 107 is not communicating signal(s) (e.g., command(s)) to the ignitor 104 to activate the ignitor 104.

FIG. 5A is a flow chart illustrating operations that can be carried out to configure the AI RGB image analysis module 107A that executes on the edge gateway device 107 for continuous flare optimization. In this embodiment, the AI RGB image analysis module 107A employs a machine learning model that is trained to generate a pixel-wise label mask that provides pixel-wise classification or labeling for an arbitrary RGB image of a flare.

The operations begin in block 501 by acquiring an RGB image of flare.

In block 503, image processing (such as image-based clustering) is used to segment the pixels of the RGB image corresponding to the efficient combustion (fire) of the flare (e.g., segment red or orange pixels of the RGB image). In this case, the total count of these pixels represents the amount of efficient combustion (fire) of the flare.

In block 505, image processing (such as image-based clustering) is used to segment the pixels of the RGB image corresponding to the inefficient combustion (smoke) of the flare (e.g., segment black pixels of the RBG image). In this case, the total count of these pixels represents the amount of inefficient combustion (smoke) of the flare.

In block 507, the results of 503 and 505 are used to generate a pixel-wise label mask for the RGB image that includes label data for the pixels of the RGB image, where the label data for a given pixel identifies the given pixel as "efficient combustion/fire" or "inefficient combustion/smoke" or "background".

In block 509, the RGB image of 501 and the pixel-wise label mask of 507 are used as training data to train the machine learning model to predict a pixel-wise label mask that includes label data, "efficient combustion/fire" or "inefficient combustion/smoke" or "background," for each pixel of an arbitrary RGB image supplied as input to the machine learning model. In embodiments, the training process of block 509 can be configured to adjust or tune model parameters and/or hyperparameters of the machine learning model. The model parameters are parameters of the model that are determined using the training data set. These are the fitted parameters. The hyperparameters are adjustable parameters that are tuned in order to obtain a model with optimal performance.

In block 511, the operations of 501 to 509 are repeated for additional RGB images of a flare in order to effectively train the machine learning model.

In block 513, the trained machine learning model is deployed for use as part of the AI RGB Image Processing Module 107A. Such deployment can be carried out by remote configuration of the edge gateway device 107 through the operation of the cloud computing environment 121, or possibly through local remote configuration of the edge gateway device 107. When deployed, the trained machine learning model predicts a pixel-wise label mask that includes label data, "efficient combustion/fire" or "inefficient combustion/smoke" or "background," for each pixel of a given RGB image of a flare processed by the RGB Image Processing Module 107A. The pixel-wise label mask can be processed to derive the total count for the pixels of the given RGB image that are labeled as "efficient combustion/fire" in the pixel-wise label mask. This total pixel count (first pixel count) can be used as the qualitative measure that represents the amount of efficient combustion (fire) in the flare. The pixel-wise label mask can also be processed to derive the total count for the pixels of the given RGB image that are labeled as "inefficient combustion/smoke" in the pixel-wise label mask. This total pixel count (second pixel count) can be used as the qualitative measure that represents the total amount of inefficient combustion (smoke) in the flare. The first and second pixel counts can be stored and output to the flare optimization module 107B for processing as flare parameters as described herein. Additionally or alternatively, the RGB Image Processing Module 107A can be further configured to process the first and second pixel counts to determine the ratio of the first pixel count over the second pixel count to represent the ratio of efficient combustion (or fire) of the flare to inefficient combustion (or smoke) of the flare. Similarly, the ratio of the second pixel count over the first pixel count can be determined to represent the ratio of inefficient combustion (or smoke) of the flare to efficient combustion (or fire) of the flare. Such ratio(s) can be stored and output to the flare optimization module 107B for processing as flare parameters as described herein.

Optionally, the operations of 501 to 513 can be repeated to further train and update the machine learning model used as part of AI RGB Image Processing Module 107A subsequent to its initial deployment. In this manner, the machine learning model used as part of AI RGB Image Processing Module 107A can be optimized over time.

Figure 5B:
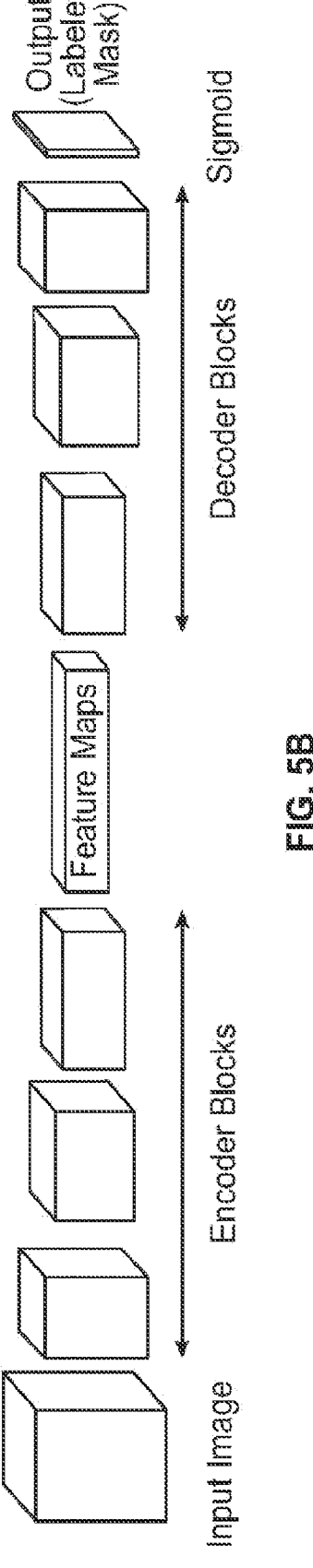
FIG. 5B is a schematic diagram of a convolutional encoder-decoder machine learning model.

In embodiments, the machine learning model that is configured and deployed as part of the AI RGB Image Processing Module 107A can employ a convolutional encoder-decoder machine learning model. The basic trainable encoder-decoder network is topologically like a multilayer convolutional neural network as shown in FIG. 5B. The encoder blocks are configured to aggregate features at multiple levels along with the down-sampling of data to obtain coarse features abstractions, and the decoder blocks are configured to up-sample these features to recover fine spatial classification. In general, the encoder blocks take an input image and generate a high-dimensional feature vector. The decoder blocks map this high-dimensional (but low resolution) feature vector to feature maps with the resolution of original input, and thus achieve pixel-wise labeling. The encoder blocks typically includes convolution filters, element-wise non-linearity, max-pooling or strided convolution based down sampling—the sequence of these steps builds a representation of the latent features. The decoder blocks typically include up sampling and transpose convolution with "skip connections" of filters from the corresponding block of the encoder. The training of the convolutional encoder-decoder machine learning model can be configured to adjust or tune model parameters and/or hyperparameters of the convolutional encoder-decoder machine learning model. The model parameters are parameters of the model that are determined using the training data set. These are the fitted parameters. The hyperparameters are adjustable parameters that are tuned in order to obtain a model with optimal performance. In alternate embodiments, other machine learning models can be used as part of the AI RGB Image Processing Module 107A, if desired.

In embodiments, the image analysis module 107A that executes on the edge gateway device 107 for continuous flare optimization can process an arbitrary RGB image of a flare to generate output data that represents color temperature of combustion (fire) for the flare.

Furthermore, in embodiments, the image analysis module 107A that executes on the edge gateway device 107 for continuous flare optimization can process an arbitrary RGB image of a flare to determine the angle (or tip) of the flare relative to vertical. This angle can be used to correct the data that represents the total amount of inefficient combustion (smoke) in the flare, and the data that represents the total amount of efficient combustion (fire) in the flare as generated by the image analysis module 107A.

Figure 6:
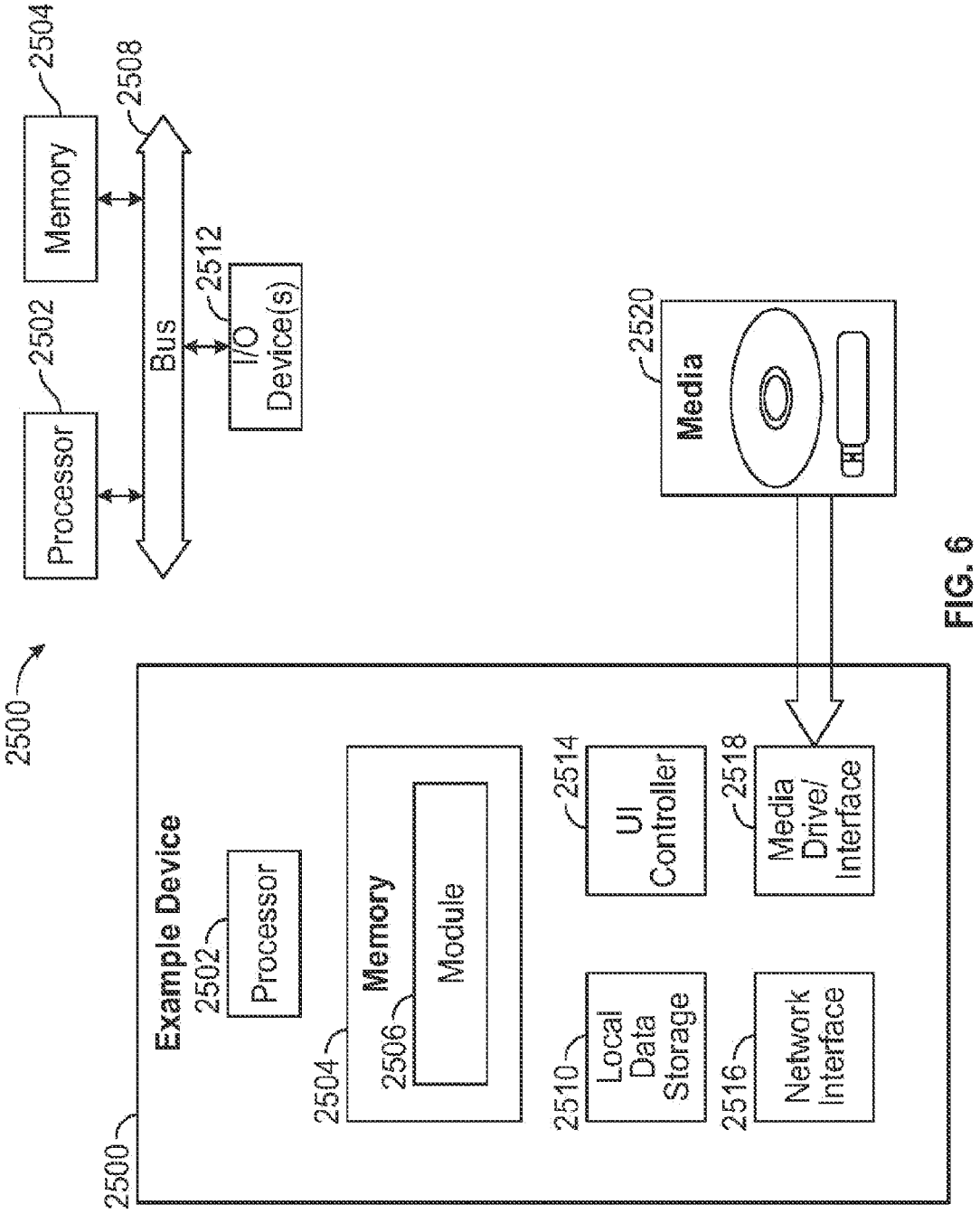
FIG. 6 is a schematic diagram of a computer system.

In some embodiments, the systems and methods of the present disclosure may involve a computing system. FIG. 6 illustrates an example computing system 2500, with a processor 2502 and memory 2504 that can be configured to implement various embodiments of the automated systems and methods for monitoring and optimizing a flare as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and nonvolatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An automated system for continuous optimization of a flaring of waste gas at an industrial facility, the automated system comprising:

an RGB camera operably coupled to a gateway device by a data communication interface; and a pressure sensor configured to measure a waste gas flowline pressure of the waste gas;

wherein:

the RGB camera is configured to capture time-series color image frames of a flare produced at the industrial facility and communicate the time-series color image frames to the gateway device;

the gateway device includes an image processing module and a flare optimization module executing on the gateway device;

the image processing module is configured to process the time-series color image frames to determine at least one flare parameter that provides a qualitative measurement of combustion efficiency of the flare over time; and the flare optimization module is configured to;

evaluate the waste gas flowline pressure to determine if the waste gas is flowing to a flare tip of the flare, the evaluation including determining if the waste gas flowline pressure is greater than a predetermined criterion which indicates the waste gas is flowing to the flare tip; and adjust a relative amount of the waste gas to at least one assist gas for the flare based on the at least one flare parameter to continuously optimize the combustion efficiency of the flare.

2. The automated system according to claim 1, wherein:

the flare optimization module is configured to control the relative amount of the waste gas to the at least one assist gas that produces the flare to optimize the at least one flare parameter.

3. The automated system according to claim 2, further comprising:

a flare stack with the flare tip;

a first flow control device operably coupled to the gateway device by the data communication interface, the first flow control device fluidly coupled to a supply of the waste gas; and a second flow control device operably coupled to the gateway device by the data communication interface, the second flow control device fluidly coupled to a supply of one or more assist gases;

wherein:

the first flow control device comprises a first electric valve and the second flow control device comprises a second electric valve; and the gateway device is configured to communicate signals or commands to at least one of the first electric valve or the second electric valve based on an execution of the flare optimization module in order to adjust the relative amount of the waste gas to the one or more assist gases supplied to the flare tip for mixing and combustion that produces the flare to continuously optimize the combustion efficiency of the flare.

4. The automated system according to claim 3, further comprising:

the pressure sensor operably coupled to the gateway device by the data communication interface, the pressure sensor configured to measure a flow line pressure of the waste gas supplied to the flare tip and communicate data representing the flow line pressure to the gateway device; and an ignitor operably coupled to the gateway device by the data communication interface, the ignitor configured to supply an ignition flame to the flare tip when activated;

wherein the gateway device is further configured to process the at least one flare parameter determined by the image processing module and the data representing the flow line pressure communicated from the pressure sensor, and selectively activate the ignitor based on such processing.

5. The automated system according to claim 1, wherein:

the at least one assist gas comprises at least one of air, steam, or other assist gas.

6. The automated system according to claim 1, wherein:

the at least one flare parameter further represents an amount of efficient combustion of the flare and an amount of inefficient combustion of the flare; and the flare optimization module optimizes the at least one flare parameter by yielding a more efficient combustion and a less efficient combustion of the flare.

7. The automated system according to claim 1, wherein:

the at least one flare parameter represents at least one of a ratio of a smoke to a fire of the flare or a ratio of the fire to the smoke of the flare; and the flare optimization module optimizes the at least one flare parameter by minimizing the ratio of the smoke to the fire of the flare or by maximizing the ratio of the fire to the smoke of the flare.

8. The automated system according to claim 7, wherein:

the time-series color image frames of the flare comprise an RGB image of the flare, the RGB image including pixels;

the ratio of the smoke to the fire of the flare is represented by a first ratio of a first pixel count of the pixels representing the smoke to a second pixel count of the pixels representing the fire; and the ratio of the fire to the smoke of the flare is represented by a second ratio of the second pixel count to the first pixel count.

9. The automated system according to claim 1, wherein:

the at least one flare parameter further represents a color temperature of a combustion of the flare; and the flare optimization module further optimizes the at least one flare parameter by adjusting the color temperature of the combustion of the flare.

10. The automated system according to claim 1, wherein:

the image processing module comprises at least one machine learning model that determines the at least one flare parameter based on a first input including an RGB image of the flare.

11. The automated system according to claim 10, wherein:

the at least one machine learning model includes a first machine learning model that is trained to generate a pixel-wise label mask for an arbitrary RGB image of the flare supplied as a second input to the first machine learning model;

the pixel-wise label mask classifies pixels of the arbitrary RGB image of the flare as corresponding to a set of predefined labels; and the set of predefined labels include a first label representing an efficient combustion of the flare and a second label representing an inefficient combustion of the flare.

12. The automated system according to claim 11, wherein:

the image processing module is further configured to process the pixel-wise label mask to determine a first pixel count and a second pixel count;

the first pixel count represents an amount of the efficient combustion of the flare; and the second pixel count represents an amount of the inefficient combustion of the flare.

13. The automated system according to claim 11, wherein:

the first machine learning model is trained with training data that includes at least one RGB image of the flare and a corresponding pixel-wise label mask for the at least one RGB image of the flare; and the pixel-wise label mask is generated by first image processing operations that segment pixels of the RGB image of the flare that correspond to the efficient combustion of the flare as well as second image processing operations that segment pixels of the RGB image of the flare that correspond to the inefficient combustion of the flare.

14. The automated system according to claim 11, wherein: the first machine learning model comprises a convolution encoder-decoder machine learning model.

15. The automated system according to claim 1, wherein: the image processing module is further configured to process an arbitrary RGB image of the flare to generate output data that represents a color temperature of combustion of the flare.

16. The automated system according to claim 1, wherein: the industrial facility comprises an oil production site, a refinery, or a chemical processing plant.

17. A method for continuous optimization of a flaring of waste gas at an industrial facility, the method comprising:

providing an RGB camera operably coupled to a gateway device by a data communication interface, wherein the RGB camera is configured to capture time-series color image frames of a flare produced at the industrial facility and communicate the time-series color image frames to the gateway device;

providing a pressure sensor configured to measure a waste gas flowline pressure of the waste gas; and configuring the gateway device to execute an image processing module and a flare optimization module, wherein:

the image processing module is configured to process the time-series color image frames to determine at least one flare parameter that provides a qualitative measurement of combustion efficiency of the flare over time; and the flare optimization module is configured to;

evaluate the waste gas flowline pressure to determine if the waste gas is flowing to a flare tip of the flare, the evaluation including determining if the waste gas flowline pressure is greater than a predetermined criterion which indicates the waste gas is flowing to the flare tip; and adjust a relative amount of the waste gas to at least one assist gas for the flare based on the at least one flare parameter to continuously optimize the combustion efficiency of the flare.

18. The method according to claim 17, wherein: the flare optimization module is configured to control the relative amount of the waste gas to the at least one assist gas that produces the flare to optimize the at least one flare parameter.

19. The method according to claim 17, wherein: the at least one assist gas comprises at least one of air, steam, or other assist gas.

20. The method according to claim 17, further comprising:

providing a flare stack with the flare tip at the industrial facility, a first flow control device operably coupled to the gateway device by the data communication interface, the first flow control device fluidly coupled to a supply of the waste gas, and second flow control device operably coupled to the gateway device by the data communication interface, the second flow control device fluidly coupled to a supply of one or more assist gases;

configuring the gateway device to communicate signals or commands to at least one of a first electric valve of the first flow control device or a second electric valve of the second flow control device based on the execution of the flare optimization module in order to adjust the relative amount of the waste gas to the one or more assist gases supplied to the flare tip for a mixing and a combustion that produces the flare to continuously optimize the combustion efficiency of the flare.

21. The method according to claim 17, wherein: the at least one flare parameter further represents an amount of an efficient combustion of the flare and an amount of an inefficient combustion of the flare; and the flare optimization module optimizes the at least one flare parameter by yielding a more efficient combustion of the flare and a less efficient combustion of the flare.

22. The method according to claim 17, wherein: the at least one flare parameter represents a ratio of a smoke to a fire of the flare or a ratio of the fire to the smoke of the flare; and the flare optimization module optimizes the at least one flare parameter by minimizing the ratio of the smoke to the fire of the flare or by maximizing the ratio of the fire to the smoke of the flare.

23. The method according to claim 17, wherein: the at least one flare parameter further represents a color temperature of a combustion of the flare; and the flare optimization module further optimizes the at least one flare parameter by adjusting the color temperature of the combustion of the flare.

24. The method according to claim 17, wherein: the image processing module comprises at least one machine learning model that determines the at least one flare parameter based on a first input including an RGB image of the flare.

25. The method according to claim 24, further comprising:

training a first machine learning model of the at least one machine learning model to generate a second input including a pixel-wise label mask for an arbitrary RGB image of the flare, wherein the second input is supplied to the first machine learning model, wherein the pixel-wise label mask classifies pixels of the arbitrary RGB image of the flare as corresponding to a set of predefined labels, wherein the set of predefined labels include a first label representing an efficient combustion of the flare and a second label representing an inefficient combustion of the flare; and deploying the first machine learning model as part of the image processing module that executes on the gateway device.

26. The method according to claim 25, wherein: the image processing module is further configured to process the pixel-wise label mask to determine a first pixel count and a second pixel count; the first pixel count represents an amount of the efficient combustion of the flare; and the second pixel count represents an amount of the inefficient combustion of the flare.

27. The method according to claim 25, wherein: the training of the first machine learning model employs training data that includes at least one RGB image of the flare and a corresponding pixel-wise label mask for the RGB image of the flare; and the pixel-wise label mask is generated by first image processing operations that segment pixels of the RGB image of the flare that correspond to the efficient combustion of the flare as well as second image processing operations that segment pixels of the RGB image of the flare that correspond to the inefficient combustion of the flare.

28. The method according to claim 25, wherein:
the first machine learning model comprises a convolution
    encoder-decoder machine learning model.

29. The method according to claim 17, further compris-
ing:
    configuring the image processing module to process an
        arbitrary RGB image of the flare to generate data that
        represents a color temperature of a combustion of the
        flare.

30. The method according to claim 17, further compris-
ing:
    providing the pressure sensor operably coupled to the
        gateway device by the data communication interface,
        the pressure sensor configured to measure a flow line
        pressure of the waste gas supplied to the flare tip and
        communicate data representing the flow line pressure to
        the gateway device, and an ignitor operably coupled to
        the gateway device by the data communication inter-
        face, the ignitor configured to supply an ignition flame
        to the flare tip when activated; and
    configuring the gateway device to process the at least one
        flare parameter determined by the image processing
        module and the data representing the flow line pressure
        communicated from the pressure sensor, and selec-
        tively activate the ignitor based on the processing.

31. The method according to claim 17, wherein:
the industrial facility comprises an oil production site, a
    refinery, or a chemical processing plant.

\*    \*    \*    \*    \*